United States Patent Office 3,501,324
Patented Mar. 17, 1970

3,501,324
MANUFACTURING AQUEOUS SLURRY OF HYDROUS CALCIUM SILICATE AND PRODUCTS THEREOF
Kazuhiko Kubo, Gifu-ken, Japan, assignor to Kabushiki Kaisha Osaka Packing Seizosho, Naniwa-ku, Osaka-shi, Japan
No Drawing. Filed June 27, 1967, Ser. No. 649,114
Claims priority, application Japan, July 15, 1966, 41/46,442; Nov. 2, 1966, 41/72,539; Dec. 26, 1966, 41/85,472, 41/85,471
Int. Cl. C04b 1/00, 7/34
U.S. Cl. 106—120                                    10 Claims

ABSTRACT OF THE DISCLOSURE

A method for manufacturing an aqueous slurry of hydrous calcium silicate being useful for the production of various calcium silicate products comprises heating an aqueous slurry of lime and a reactive siliceous material under a steam pressure to effect and complete reaction between line and silica. From such aqueous slurry of hydrous calcium silicate various useful calcium silicate products can be prepared by simple procedure, e.g. by shaping the slurry into desired shape and drying the shaped article under atmospheric pressure without applying any steam pressure.

---

This invention relates to a useful aqueous slurry of hydrous calcium silicate being useful for the manufacture of various calcium silicate products. More particularly, the invention pertains to an aqueous slurry containing hydrous calcium silicate which has either a tobermorite crystalline structure, a xonotlite crystalline structure or a crystalline structure of a mixture of tobermorite and xonotlite crystals and to various calcium silicate products prepared therefrom, such as thermal or electric insulating materials, building boards, tiles, mouldings and the like.

It is well known that silica is reacted with lime at an elevated temperature to produce calcium silicate. Many attempts have been made to produce calcium silicate products, particularly light weight thermal insulating materials, utilizing such a lime-silica reaction. In the prior art it has been considered essential for increasing bonding strength of the final products to cause in the first stage partial reaction between the lime and siliceous material, and then, after shaping the resultant mixture, complete said reaction in indurating stage of the shaped materials under a steam pressure in a large volume autoclave. In fact, insofar as the applicant is aware there has been proposed no aqueous slurry of hydrous calcium silicate, from which various calcium silicate products having excellent mechanical strength can be manufactured without applying any steam pressure for induration.

One object of the invention is to provide an aqueous slurry of hydrous calcium silicate, which can be easily moulded into any desired shape by the convenient moulding processes. Another object of the invention is to provide an aqueous slurry of hydrous calcium silicate, from which various useful calcium silicate products are obtainable without applying any steam pressure. Further object of the invention is to provide a method for manufacturing an aqueous slurry of hydrous calcium silicate having the above characteristics. Still further object of the invention is to provide a method for manufacturing calcium silicate products from the above slurry, in which there is no need to use a large volume autoclave.

The above and other objects of the invention will be apparent from the following description.

It has now been found that when an aqueous slurry containing lime and silica in an approximately theoretical amount to produce tobermorite and/or xonotlite is heated with stirring under steam pressure for a time sufficient to complete the lime-silica reaction, there is produced an aqueous slurry of hydrous calcium silicate which can be easily moulded into any desired shape by the convenient moulding processes and from which various calcium silicate products having excellent mechanical strength, particularly bending strength, are obtainable without using a large volume autoclave by merely drying under atmospheric pressure.

This invention is based on the above new discoveries and characterized in heating an aqueous slurry of lime and a reactive siliceous material in a molar ratio of $CaO:SiO_2$ between 0.65:1 and 1.3:1 with stirring under a saturated steam pressure of at least 5 kg./cm.$^2$ g. for a time sufficient to complete the reaction between lime and silica.

The reactive siliceous material used in the invention may include a natural or synthetic amorphous silica or silicate or mixtures thereof. Examples are siliceous sand, diatomaceous earth, clays, silica, gel, pozzolan, etc. Of siliceous materials those containing below 2.0 weight percent of alumina may be preferable source for the production of xonotlite crystals, although those containing larger amount of alumina may be advantageously used for the production of tobermorite crystals. The lime used in the invention may be quick lime, slaked lime, acetylene residuum, carbide residuum, etc.

In the present invention the amount of the lime relative to the siliceous material should be in the molar ratio of $CaO:SiO_2$ between 0.65:1 and 1.3:1. The preferable ratio may be selected in accordance with the crystalline structure to be desired. Although other reaction conditions, e.g., pressure, temperature, period, etc. also affect the crystalline structure, in general the molar ratio of $CaO:SiO_2$ between 0.65:1 and 1:1 is preferable for the production of tobermorite having the formula $4CaO \cdot 5SiO_2 \cdot 5H_2O$ or $5CaO \cdot 6SiO_2 5H_2O$; and the molar ratio of $CaO:SiO_2$ between 0.8:1 and 1.3:1 is preferable for the production of xonotlite having the formula $5CaO \cdot 5SiO_2 \cdot H_2O$ or $6CaO \cdot 6SiO_2 \cdot H_2O$. The most desirable molar ratio of $CaO:SiO_2$ is 0.83:1 for tobermorite and 1:1 for xonotlite.

The amount of water employed in the starting slurry can be varied over a wide range, the larger amounts of water tending to give less dense products. Suitable amounts of water are from 3.5 to 25 times, preferably 5 to 15 times, the combined dry weight of the lime, siliceous material and reinforcing fibres, if any.

As the reinforcing fibres there may be used various inorganic fibres, such as asbestos fibers, rock wool, glass fibres, etc. Such reinforcing fibres are used in the amount of less than 50%, preferably about 5 to 20%, based on the weight of dry solids, i.e the combined weight of lime, siliceous material and fibres.

To accelerate the production of xonotlite crystals finely divided wollastonite particles ($CaO \cdot SiO_2$) may be added to the starting aqueous slurry, whereby hydrous calcium silicate of mainly xonotlite crystals is obtainable in a shorter reaction period. This effect is marked when wollastonite is added to the slurry containing lime in the molar ratio of CaO:SiO$_2$ between 0.8:1–1.3:1. The suitable amount of wallastonite is 2 to 30 weight percent, preferably 5 to 20 weight percent, based on the weight of the dry solids (lime, siliceous material and fibres, if any).

In the present invention the starting aqueous slurry is heated with stirring under a saturated steam pressure of at least 5 kg./cm.$^2$ g. The higher the steam pressure the shorter becomes reaction period. Suitable pressure may be selected in accordance with the crystalline structure of the hydrous calcium silicate to be desired. For the production of tobermorite a pressure within 8 to 15 kg./cm.$^2$ g. is preferable, and for xonotlite a pressure within 8 to 50 kg./cm.$^2$ g. is preferable. The reaction temperature is the saturated temperature under such saturated steam pressure. The reaction system should be stirred to prevent the production of the hardened mass difficult for shaping, whereby yielding hydrous calcium silicate in the form of aqueous slurry which is readily moulded into the desired shape. Although the continuous stirring is desirable, the system may be stirred intermittently insofar as the production of the hardened mass is prevented.

The period required to complete the reaction between lime and silica will be related to the reaction pressure and temperature, mixing ratio of the lime and siliceous material, the reactivity of the siliceous material used and other factors. In general, the reaction to produce tobermorite under 8–15 kg./cm.$^2$ g. is completed in about 1–10 hrs. and the reaction to produce xonotlite under 8–50 kg./cm.$^2$ g. is completed in about 0.5–20 hrs.

The reaction vessel used in the invention is pressure autoclave equipped with an agitator or stirrer and pressure gauge and the like pressure reactor.

One preferred method of performing the invention is as follows: The starting slurry is first prepared by dispersing lime and siliceous material into water in the molar ratio of CaO:SiO$_2$ between 0.65:1 to 1.3:1. Wollastonite particles and/or reinforcing fibres are also added, if required. The resultant slurry is placed into an autoclave with a stirrer and pressure gauge. Thereafter the system is heated with stirring under a saturated steam pressure of at least 5 kg./cm.$^2$ g. for a time sufficient to complete the silica-lime reaction, whereby the desired aqueous slurry of hydrous calcium silicate is obtained.

The aqueous slurry of hydrous calcium silicate obtained by the present invention can be moulded readily into any desired shape by the conventional moulding processes, such as compression moulding, extrusion moulding, casting, shaping with filter press or wet machine, etc., and by merely drying the shaped material under atmospheric pressure, the calcium silicate products having excellent mechanical strength can be obtained. Therefore there is no need to use a large volume autoclave for induration of the shaped materials. To shorten the drying period heat may be applied preferable being 100–200° C. for tobermorite and 100–500° C. for xonotlite.

If required, various reinforcing materials, such as inorganic or organic fibres, may be added to the present slurry, prior to the shaping. The amount of the materials varies over a wide range in accordance with the kinds of the products to be desired. When fibre boards are prepared by using the present hydrous calcium silicate as a binder, for example, such fibrous materials may be used in such a large amount as 10 times by weight the slurry of the invention.

According to the invention various calcium silicate mouldings, such as thermal insulating materials, can be manufactured by merely drying the shaped substances under atmospheric pressure without applying any steam pressure. Thus it becomes possible to produce various mouldings in continuous manner by extrusion moulding.

In the production of building boards, thermal insulating materials, etc., moreover, the slurry prepared in accordance with the process of the invention is sprayed to or coated on the various articles on the spot, and left for drying to produce the desired products having excellent mechanical strength.

As well known in the art, calcium silicate products of tobermorite crystals tend to markedly deteriorate in the mechanical strength when heated to a temperature of 650° C., and those of xonotlite crystals also have the same tendency when heated to 1,000° C. According to the investigation of the present inventor, it has been found that when clays are mixed to the present slurry of hydrous calcium silicate prior to the shaping or drying stage, such disadvantages are dissolved and there are obtainable the calcium silicate products which retain their inherent mechanical strength even after heated at such high temperatures. Such effect can not be attained when clays are added to the starting slurry prior to the lime-silica reaction. Examples of clays are bentonite, kaolin, pylophilite, fire clay, etc. The suitable amount of clays is usually 3 to 50 weight percent, preferably 5 to 40 weight percent, based on the weight of the dry solids in the present slurry.

When the calcium silicate products of xonotlite crystals are used as a thermal insulating material, they tend to contract by heating and to deteriorate the thermal insulating effect. To prevent such contraction it is desirable to preheat the products at 800–1,000° C. prior to use.

For fuller understanding of the invention, examples are given below, in which all parts and percentages are shown by weight, and bending strength and coefficient of linear contraction were determined in accordance with JIS (Japanese Industrial Standard)–A–9510.

EXAMPLE 1

A slurry was prepared by mixing 47.5 parts of siliceous sand containing the following components, 44.5 parts of quick lime, 8.0 parts of asbestos fibre and 1,000 parts of water.

| Siliceous sand: | Percent |
| --- | --- |
| SiO$_2$ | 91.91 |
| Al$_2$O$_3$ | 4.46 |
| Fe$_2$O$_3$ | 0.32 |
| Ig. loss | 1.45 |
| Other | 1.86 |

The slurry thus prepared was immediately placed in a 14 liter autoclave with a stirrer and pressure gauge, and after covering tightly, the system was heated to 175° C. with stirring of 105 r.p.m. and pressure in the autoclave reached to 8 kg./cm.$^2$ g., which was maintained for 5 hours, Then the stirring and heating were stopped and the system was left for cooling, recovering gradually the pressure in the autoclave to atmospheric pressure in 1 hour.

The resultant reaction mixture was taken out from the autoclave in the form of an aqueous slurry and by the diffraction of X-rays the crystalline structure of the hydrous calcium silicate contained therein was confirmed to be tobermorite crystals.

EXAMPLE 2

A slurry prepared by mixing 30 parts of siliceous sand shown in Example 1, 24.2 parts of diatomaceous earth, 37.8 parts of quick lime, 8 parts of asbestos fibre and 1,000 parts of water was reacted in the same manner as in Example 1.

The resultant reaction mixture was taken out from the autoclave in the form of an aqueous slurry and by the diffraction of X-rays the crystalline structure of the hydrous calcium silicate was confirmed to be tobermorite crystals.

EXAMPLE 3

A slurry prepared by mixing 47.5 parts of amorphorous silica containing the following components, 44.5 parts of quicklime, 7 parts of asbestos fibre and 1,000 parts of water was reacted in the same manner as in Example 1 except that a 179.04° C. reaction temperature under a 9 kg./cm.$^2$ g. saturated steam pressure was applied for 10 hrs.

Amorphorous silica:

| | Percent |
|---|---|
| $SiO_2$ | 96.97 |
| $Al_2O_3$ | 1.06 |
| $Fe_2O_3$ | 0.04 |
| Ig. loss | 1.30 |
| Other | 0.63 |

The resultant reaction mixture was taken out from the autoclave in the form of an aqueous slurry and by the diffraction of X-rays the crystalline structure of the hydrous calcium silicate contained therein was confirmed to be xonotlite crystals.

The slurries obtained by the Examples 1, 2 and 3 were subjected respectively to compressive moulding and dried at about 150° C. The physical properties of the resultant mouldings were shown in the Table 1 below.

TABLE 1

| | Specific gravity (g./cm.$^3$) | Bending strength (kg./cm.$^2$) |
|---|---|---|
| Ex. 1 | 0.212 | 7.83 |
| Ex. 2 | 0.251 | 5.57 |
| Ex. 3 | 0.194 | 10.6 | sure in the autoclave reached to the saturated pressure under such temperature, which was maintained for the period shown in Table 2. Then the stirring and heating were stopped and the system was left for cooling, recovering gradually the pressure in the autoclave to atmospheric pressure in 1 hour.

The resultant reaction mixture was taken out from the autoclave in the form of aqueous slurry and 7 parts of asbestos fibre were mixed with 100 parts of the slurry. The mixture was subjected to compression moulding and dried at about 150° C. The physical properties of the resultant mouldings were shown in the Table 2 below, in which crystalline structure was confirmed by diffraction of X-rays for the calcium silicate contained in the resultant slurry, and "T," "F" and "X" represent tobermorite, foshagite and xonotlite crystals respectively.

TABLE 2

| Sample No. | Reaction condition | | | | Crystalline structure | Specific gravity (g./cm.$^3$) | Bending strength (kg./cm.$^2$) |
|---|---|---|---|---|---|---|---|
| | Molar ratio (CaO/SiO$^2$) | Press. (kg./cm.$^2$ g.) | Temp.(° C.) | Period (hrs.) | | | |
| 1 | 0.65 | 9 | 179.04 | 8 | T | 0.203 | 3.09 |
| 2 | 0.65 | 15 | 200.43 | 7 | T | 0.209 | 3.20 |
| 3 | 0.65 | 25 | 224.98 | 5 | T | 0.183 | 3.18 |
| 4 | 0.83 | 5 | 158.08 | 30 | T | 0.210 | 3.34 |
| 5 | 0.83 | 9 | 179.04 | 5 | T | 0.211 | 4.97 |
| 6 | 0.83 | 15 | 200.43 | 3 | T | 0.211 | 4.76 |
| 7 | 1.0 | 9 | 179.04 | 5 | T+F | 0.220 | 7.5 |
| 8 | 1.0 | 11 | 187.08 | 5 | T+F | 0.220 | 9.22 |
| 9 | 1.0 | 15 | 200.43 | 4 | T | 0.210 | 5.32 |

EXAMPLE 5

In this example, 16 samples were prepared by the same manner as in Example 4, except that amorphous silica specified in Example 3 was used in place of siliceous sand. The reaction conditions and the physical properties of the resultant products were shown in Table 3 below.

TABLE 3

| Sample No. | Reaction condition | | | | Crystalline structure | Specific gravity (g./cm.$^3$) | Bending strength (kg./cm.$^2$) |
|---|---|---|---|---|---|---|---|
| | Molar ratio (CaO/SiO$^2$) | Press. (kg./cm.$^2$ g.) | Temp.(° C.) | Period (hrs.) | | | |
| 10 | 0.85 | 9 | 179.04 | 40 | X | 0.215 | 4.0 |
| 11 | 0.85 | 11 | 187.08 | 30 | X | 0.212 | 4.2 |
| 12 | 0.85 | 25 | 224.98 | 8 | X | 0.220 | 3.82 |
| 13 | 1.0 | 9 | 179.04 | 15 | X | 0.210 | 8.42 |
| 14 | 1.0 | 11 | 187.08 | 8 | X | 0.200 | 6.43 |
| 15 | 1.0 | 11 | 187.08 | 8 | X | 0.450 | 30.40 |
| 16 | 1.0 | 15 | 200.43 | 8 | X | 0.204 | 7.07 |
| 17 | 1.0 | 15 | 200.43 | 8 | X | 0.448 | 32.41 |
| 18 | 1.0 | 20 | 213.85 | 5 | X | 0.201 | 7.76 |
| 19 | 1.0 | 25 | 224.98 | 4 | X | 0.205 | 7.52 |
| 20 | 1.0 | 30 | 234.57 | 2 | X | 0.208 | 3.18 |
| 21 | 1.0 | 50 | 263.80 | 0.5 | X | 0.190 | 3.80 |
| 22 | 1.2 | 9 | 179.04 | 35 | X | 0.209 | 5.2 |
| 23 | 1.2 | 11 | 187.08 | 28 | X | 0.216 | 5.8 |
| 24 | 1.2 | 15 | 200.43 | 20 | X | 0.218 | 6.4 |
| 25 | 1.2 | 25 | 224.98 | 9 | X | 0.207 | 4.9 |

EXAMPLE 4

In this example, 9 samples were prepared by the following manner:

A 14 liter autoclave with a stirrer and pressure gauge was charged with an aqceous slurry of 1,000 parts of water and 100 parts of a mixture of siliceous sand same as in Example 1 and quick lime. The molar ratio of CaO to SiO$_2$ in said mixture was shown in Table 2 below. After covering the autoclave tightly, the system was heated with stirring to the temperature shown in the Table 1 and pres-

EXAMPLE 6

The predetermined amount of wollastonite was added to an aqueous slurry of 1,000 parts of water and 100 parts of a mixture of amorphous silica specified in Example 3 and quick-lime in a molar ratio of CaO:SiO$_2$ of 1:1, and the mixture was reacted by the same manner as in Example 4, except that the reaction conditions specified in Table 4 below were applied. From the resultant slurry mouldings were prepared by the same manner as in Example 4, and physical properties thereof were shown in the following Table 4.

TABLE 4

| Sample No. | Amount of wollastonite (wt. percent) | Press (kg./cm.²g.) | Temp. (°C.) | Period (hrs.) | Crystalline structure | Physical properties | |
|---|---|---|---|---|---|---|---|
| | | | | | | Specific gravity (g./cm.³) | Bending strength (kg./cm.²) |
| 24 | 0 | 10 | 183.20 | 10 | X | 0.210 | 6.34 |
| 25 | 2 | 10 | 183.20 | 7 | X | 0.208 | 6.44 |
| 26 | 5 | 10 | 183.20 | 6 | X | 0.206 | 6.75 |
| 27 | 10 | 10 | 183.20 | 6 | X | 0.212 | 6.90 |
| 28 | 20 | 10 | 183.20 | 6 | X | 0.215 | 6.42 |

EXAMPLE 7

An aqueous slurry of 1,000 parts of water and 100 parts of a mixture of amorphous silica and quick-lime in the molar ratio of $CaO:SiO_2$ of 1:1 was reacted in the same manner as in Example 3 except that the reaction was conducted under 10 kg./cm.² g. of saturated pressure for 9 hrs.

To 100 parts of the resultant slurry were added 7 parts of asbestos fibre and the predetermined amount of the clay specified below and the mixture was moulded by the same method as in Example 3. Physical properties of the moulding after preparation and after 3 hrs. sintering at 1,000° C. were shown in the Table 5 below.

TABLE 5

| Sample No. | Clay | Amount of clay (wt. percent) | Crystalline structure | After preparation | | After 3 hrs. sintering | | |
|---|---|---|---|---|---|---|---|---|
| | | | | Specific gravity (g./cm.³) | Bending strength (kg./cm.²) | Specific gravity (g./cm.³) | Bending strength (kg./cm.²) | Coefficient of linear contraction (percent) |
| 29 | | 0 | X | 0.183 | 3.69 | 0.181 | 1.25 | 1.50 |
| 30 | Bentonite | 5 | X | 0.190 | 4.02 | 0.186 | 3.71 | 0.97 |
| 31 | do | 10 | X | 0.205 | 4.78 | 0.201 | 3.79 | 1.04 |
| 32 | do | 15 | X | 0.215 | 7.36 | 0.216 | 6.41 | 1.17 |
| 33 | do | 20 | X | 0.213 | 6.51 | 0.209 | 5.23 | 1.23 |
| 34 | do | 40 | X | 0.209 | 4.06 | 0.203 | 3.83 | 1.27 |
| 35 | Diatomaceous earth | 10 | X | 0.215 | 5.36 | 9.212 | 4.70 | 1.13 |
| 36 | do | 20 | X | 0.220 | 5.22 | 0.217 | 5.22 | 1.00 |

Analysis values of bentonite and diatomaceous earth were as follows:

Bentonite:
| | Percent |
|---|---|
| $SiO_2$ | 70.13 |
| $Al_2O_3$ | 16.29 |
| $Fe_2O_3$ | 0.13 |
| CaO | 0.70 |
| MgO | 2.64 |
| TiO | 0.06 |
| $K_2O$ | 0.32 |
| Ig. loss | 8.26 |
| Other | 1.47 |

Diatomaceous earth:
| | |
|---|---|
| $SiO_2$ | 79.30 |
| $Al_2O_3$ | 9.05 |
| $Fe_2O_3$ | 2.30 |
| CaO | 0.03 |
| MgO | 0.05 |
| Ig. loss | 7.31 |
| Other | 1.96 |

What we claim is:

1. A method for manufacturing an aqueous slurry of calcium silicate crystals capable of producing shaped product of calcium silicate crystals without application of any steam pressure, which comprises heating with stirring an aqueous slurry containing lime and a reactive siliceous material in a molar ratio of $CaO:SiO_2$ between 0.65:1 and 1.3:1 under a steam pressure of at least 5 kg./cm.² gauge to produce crystallized calcium silicate hydrate dispersed in aqueous medium and to prevent the production of any hardened mass therein.

2. The method for manufacturing an aqueous slurry of hydrous calcium silicate according to claim 1, in which said aqueous slurry contains the lime and the reactive siliceous material in a molar ratio of $CaO:SiO_2$ between 0.65:1 and 1:1 for the production of tobermorite crystals.

3. The method for manufacturing an aqueous slurry of hydrous calcium silicate according to claim 1, in which said aqueous slurry contains the lime and the reactive siliceous material in a molar ratio of $CaO:SiO_2$ between 8.80:1 and 1.3:1 for the production of zonotlite crystals.

4. The method for manufacturing an aqueous slurry of hydrous calcium silicate according to claim 2, in which said aqueous slurry of the lime and the reactive siliceous material in a molar ratio of $CaO:SiO_2$ between 0.65:1 and 1:1 is heated under a saturated steam pressure of 8 to 15 kg./cm.² g. for 1 to 10 hrs. to produce tobermorite crystals.

5. The method for manufacturing an aqueous slurry of hydrous calcium silicate according to claim 3, in which said aqueous slurry of the lime and the reactive siliceous material is heated under a saturated steam pressure of 8 to 50 kg./cm.² g. for 0.5 to 20 hrs. to produce xonotlite crystals.

6. The method for manufacturing an aqueous slurry of hydrous calcium silicate according to claim 5, in which said aqueous slurry of the lime and the reactive siliceous material contains 2 to 30 weight percent of wollastonite.

7. A method for manufacturing a shaped product of calcium silicate crystals, which comprises heating with stirring an aqueous slurry containing lime and a reactive siliceous material in a molar ratio of $CaO:SiO_2$ between 0.65:1 and 1.3:1 under a steam pressure of at least 5 kg./cm.² gauge to produce crystallized calcium silicate hydrate dispersed in the aqueous medium, molding the resultant aqueous slurry of calcium silicate crystals into a desired shape and drying the shaped mass.

8. The method for manufacturing a shaped product of calcium silicate crystals, which comprises heating with stirring an aqueous slurry containing lime and a reactive siliceous material in a molar ratio of $CaO:SiO_2$ between 0.65:1 and 1.3:1 under a steam pressure of at least 5 kg./cm.² gauge to produce crystallized calcium silicate hydrate dispersed in the aqueous medium, mixing the resultant aqueous slurry of calcium silicate crystals with a clay in an amount of 3 to 50 weight percent of clay based on the weight of total solid, molding the mixture into a desired shape and drying the shaped mass.

9. The method for manufacturing a shaped product of tobermorite crystals according to claim 7, in which said aqueous slurry of lime and siliceous material contains CaO and $SiO_2$ in a molar ratio of between 0.65:1 and 1:1 which is heated with stirring under a saturated steam pressure of 8 to 15 kg./cm.² gauge for 1 to 10 hours to produce tobermorite crystals dispersed in the aqueous medium.

10. The method for manufacturing a shaped product of xonotlite crystals according to claim 7, in which said aqueous slurry of lime and siliceous material contains CaO and $SiO_2$ in a molar ratio of between 0.80:1 and 1.3:1, which is heated with stirring under a saturated steam pressure of 8 to 50 kg./cm.² gauge for 0.5 to 20 hours to produce xonotlite crystals dispersed in the aqueous medium.

References Cited

UNITED STATES PATENTS 3,116,158  12/1963  Taylor _____ 106—120
2,540,354  2/1951   Selden _____ 106—120

EDWARD STERN, Primary Examiner

U.S. Cl. X.R.

23—110